(12) United States Patent
Matsuda

(10) Patent No.: US 8,174,940 B2
(45) Date of Patent: May 8, 2012

(54) OPTICAL DISC APPARATUS FOR EXECUTING RECORDING OR REPRODUCING ONTO/FROM A MULTILAYERED OPTICAL DISC HAVING AT LEAST 3 LAYERS

(75) Inventor: Takahiro Matsuda, Chigasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/768,783

(22) Filed: Apr. 28, 2010

(65) Prior Publication Data

US 2011/0075528 A1    Mar. 31, 2011

(30) Foreign Application Priority Data

Sep. 30, 2009 (JP) ................................. 2009-225854

(51) Int. Cl.
G11B 7/00    (2006.01)

(52) U.S. Cl. .................... 369/44.26; 369/44.32

(58) Field of Classification Search .................... None
See application file for complete search history.

(56) References Cited

U.S. PATENT DOCUMENTS

| | | | |
|---|---|---|---|
| 6,172,957 B1 * | 1/2001 | Ogasawara | ..................... 369/94 |
| 2002/0060958 A1 * | 5/2002 | Ando et al. | ............... 369/44.23 |
| 2005/0180277 A1 | 8/2005 | Iljima et al. | |
| 2005/0254360 A1 | 11/2005 | Sameshima et al. | |
| 2007/0008844 A1 * | 1/2007 | Noma | ..................... 369/47.11 |
| 2008/0049582 A1 * | 2/2008 | Nishioka et al. | ......... 369/112.01 |
| 2011/0075528 A1 * | 3/2011 | Matsuda | ................... 369/44.32 |

FOREIGN PATENT DOCUMENTS

| | | |
|---|---|---|
| JP | 2005-327425 | 11/2005 |
| JP | 4069087 | 1/2008 |
| JP | 2008-090911 | 4/2008 |
| JP | 2008-243338 | 10/2008 |

* cited by examiner

*Primary Examiner* — Peter Vincent Agustin

(74) *Attorney, Agent, or Firm* — Antonelli, Terry, Stout & Kraus, LLP.

(57) ABSTRACT

An optical disc apparatus, for executing recording or reproducing onto/from a multilayered optical disc having "N" pieces of recording layers (N≧3, "N" is an integer), from a first layer to a $N^{th}$ layer, including a light emitting portion configured to emit a laser beam, a light receiving portion, a correcting portion configured to correct a tilt of the optical disc or an aberration of the laser beam, an adjusting portion, a detecting portion, and a selecting portion configured to select "A" pieces of recording layers (A<N, and "A" is an integer) depending on the layer structure of the optical disc. The adjusting portion obtains the correction volumes on the "A" pieces of recording layers, which are selected by the selecting portion.

11 Claims, 11 Drawing Sheets

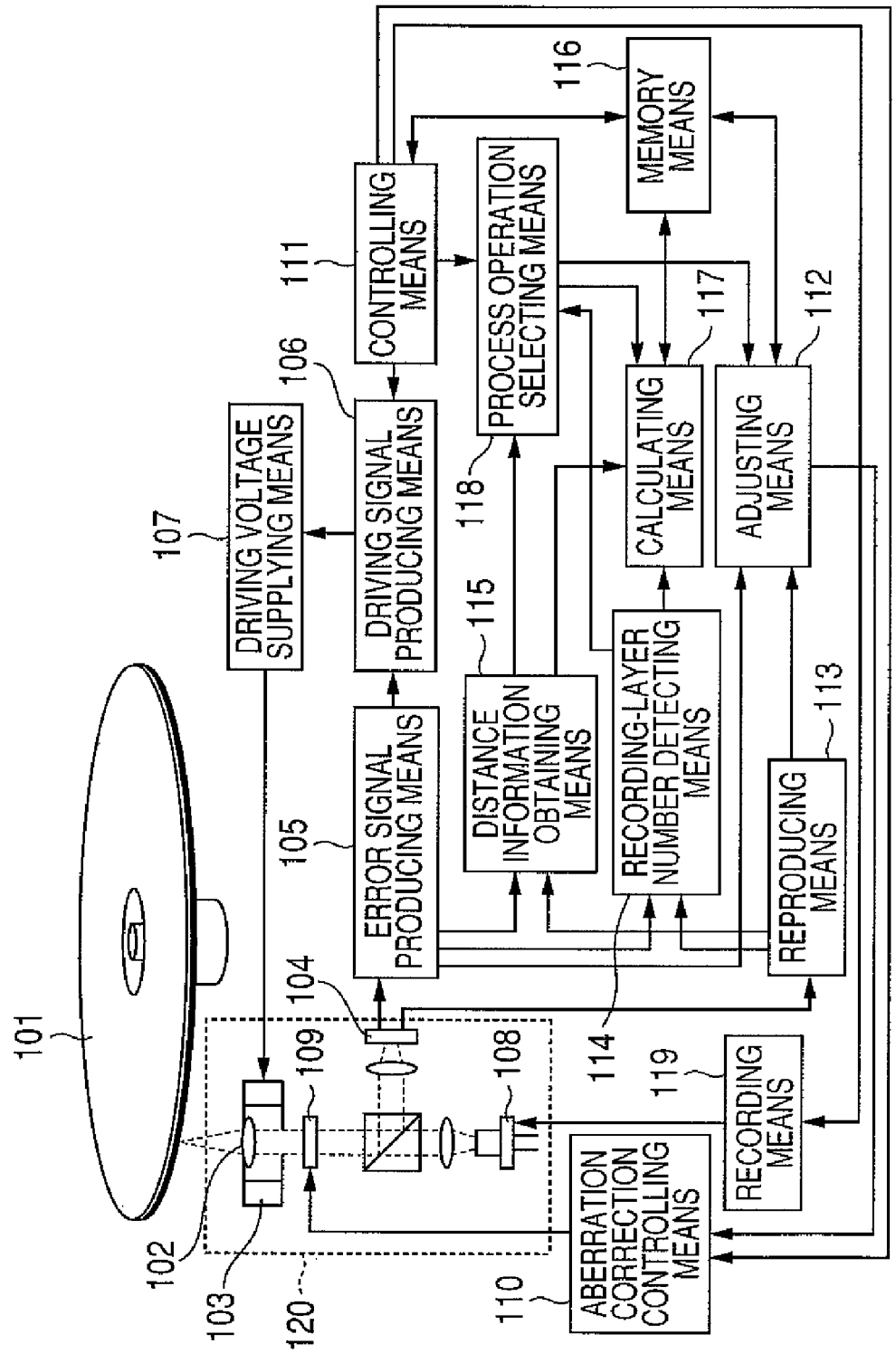

WITH TILTING

WITHOUT TILTING

COMA ABERRATION GENERATED DUE TO DISC INCLINATION $W_C \propto NA^3$
$W_C \propto t$
HOWEVER,
$W_C$ : COMA ABERRATION
$NA$ : NA (NUMBER OF APERTURE) OF OBJECTIVE LENS
$t$ : THICKNESS OF DISC SUBSTRATE FIG. 7A
FIG. 7B
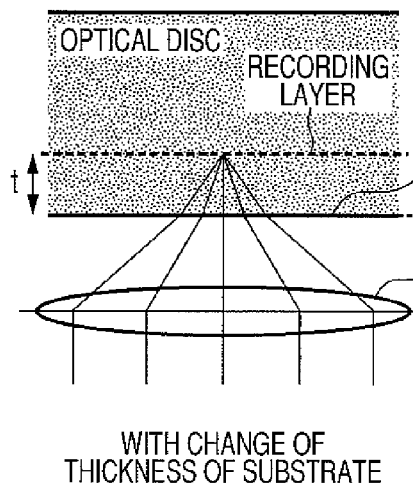
WITH CHANGE OF
THICKNESS OF SUBSTRATE
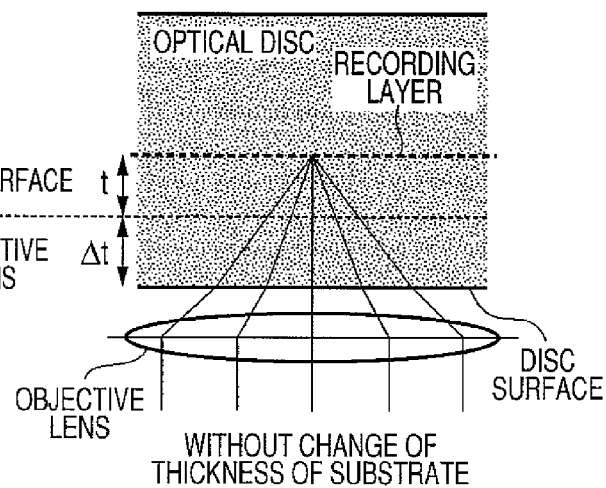
WITHOUT CHANGE OF
THICKNESS OF SUBSTRATE
COMA ABERRATION GENERATED DUE TO CHANGE
OF THICKNESS OF DISC SUBSTRATE
$W_S \propto NA^4$
$W_S \propto \Delta t$
HOWEVER,
$W_S$ : COMA ABERRATION
$\Delta t$ : CHANGE VOLUME OF DISC SUBSTRATE OR ERROR VOLUME
$NA$ : NA (NUMBER OF APERTURE) OF OBJECTIVE LENS

FIG. 10

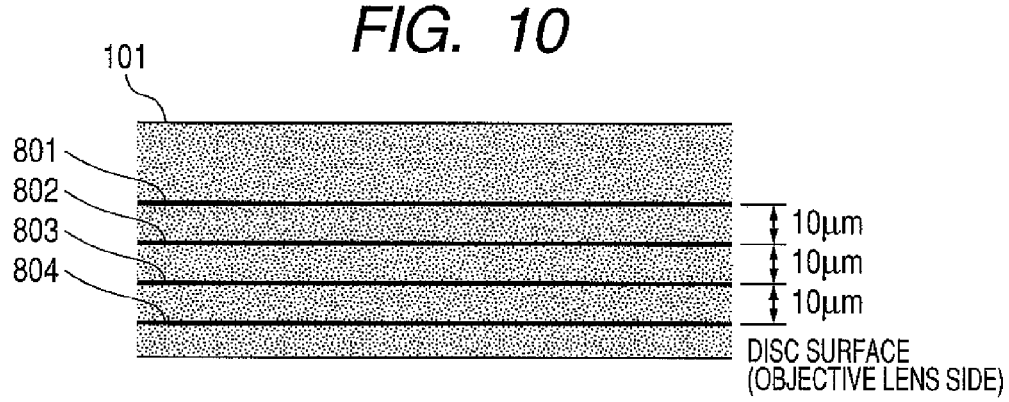

FIG. 11

| | | PATTERN 1 | PATTERN 2 | PATTERN 3 | PATTERN 4 |
|---|---|---|---|---|---|
| CLASSIFICATION BY SELECTING MEANS (WHEN $D^{th}$=15μm) | 1ST RECORDING LAYER | "a" GROUP | "a" GROUP | "b" GROUP | "b" GROUP |
| | 2ND RECORDING LAYER | "b" GROUP | "b" GROUP | "a" GROUP | "a" GROUP |
| | 3RD RECORDING LAYER | "a" GROUP | "b" GROUP | "a" GROUP | "b" GROUP |
| | 4TH RECORDING LAYER | "b" GROUP | "a" GROUP | "b" GROUP | "a" GROUP |
| NUMBER OF TIMES OF EXECUTION OF ADJUSTMENT | | 2 | 2 | 2 | 2 |

⇧ ※RELATION OF CALCULATION PROCESS
(CORRECTION VALUE AT TIP OF ARROW IS CALCULATED UPON BASIS CORRECTION VALUE AT ORIGIN OF ARROW)

FIG. 12

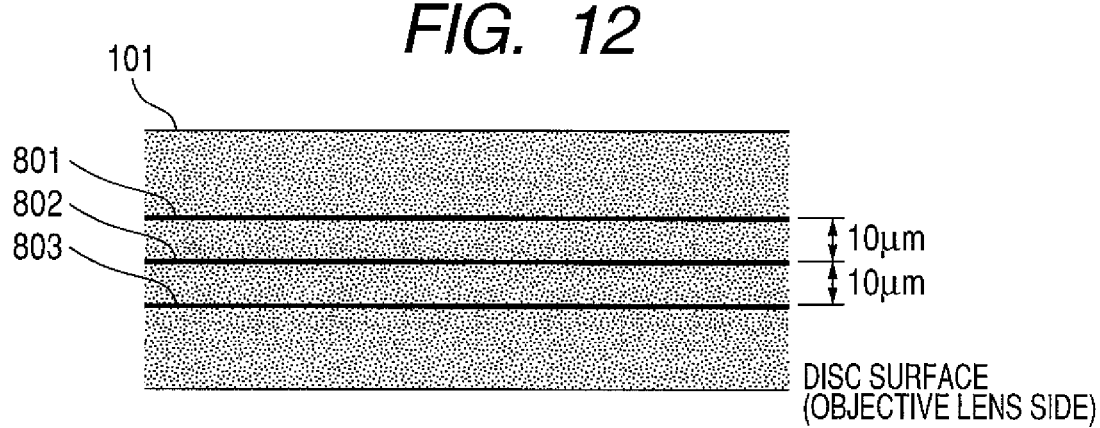

- 101
- 801
- 802
- 803

10μm
10μm

DISC SURFACE (OBJECTIVE LENS SIDE)

FIG. 13

| | | PATTERN 1 | PATTERN 2 |
|---|---|---|---|
| CLASSIFICATION BY SELECTING MEANS (WHEN $D^{th}=15\mu m$) | 1ST RECORDING LAYER | "a" GROUP | "b" GROUP |
| | 2ND RECORDING LAYER | "b" GROUP | "a" GROUP |
| | 3RD RECORDING LAYER | "a" GROUP | "b" GROUP |
| NUMBER OF TIMES OF EXECUTION OF ADJUSTMENT | | 2 | 1 |

⇧ ※RELATION OF CALCULATION PROCESS
(CORRECTION VALUE AT TIP OF ARROW IS CALCULATED UPON BASIS CORRECTION VALUE AT ORIGIN OF ARROW)

FIG. 16

| | | A | B | C | D |
|---|---|---|---|---|---|
| CLASSIFICATION BY SELECTING MEANS (WHEN $D^{th}=15\mu m$) | 1ST RECORDING LAYER | NOT EXECUTED | ALREADY ADJUSTED | ALREADY CALCULATED | ALREADY ADJUSTED |
| | 2ND RECORDING LAYER | NOT EXECUTED | ALREADY CALCULATED | ALREADY ADJUSTED | ALREADY CALCULATED |
| | 3RD RECORDING LAYER | NOT EXECUTED | NOT EXECUTED | NOT EXECUTED | NOT EXECUTED |
| | 4TH RECORDING LAYER | NOT EXECUTED | NOT EXECUTED | NOT EXECUTED | ALREADY ADJUSTED |
| OPERATION WHEN MOVING TO THIRD RECORDING LAYER | | ADJUSTMENT | ADJUSTMENT | CALCULATION | CALCULATION |

⇧ ※RELATION OF CALCULATION PROCESS
(CORRECTION VALUE AT TIP OF ARROW IS CALCULATED UPON BASIS CORRECTION VALUE AT ORIGIN OF ARROW)

OPTICAL DISC APPARATUS FOR EXECUTING RECORDING OR REPRODUCING ONTO/FROM A MULTILAYERED OPTICAL DISC HAVING AT LEAST 3 LAYERS

This application relates to and claims priority from Japanese Patent Application No. 2009-225854 filed on Sep. 30, 2009, the entire disclosure of which is incorporated herein by reference.

BACKGROUND OF THE INVENTION

The present invention relates to an optical disc apparatus for conducting recording/reproducing of information onto/from an optical recording medium, such as, an optical disc, representatively, for example, and in particular, it relates to an optical disc apparatus for conducting recording/reproducing of information onto/from an optical disc having a plural number of recording layers thereon.

In general, within the optical disc apparatus, a coma aberration generates on an optical spot of condensed lights, because of an inclination (i.e., a tilt) of the disc with respect to an optical axis of a laser beam, which is generated due to warping or curving of the disc and/or a clamping error, etc.

Also, as a document relating to a tilt control or adjustment of, there is already known the following Patent Document 1. The invention described in the Patent Document 1 relates to a tilt correction processing method in an optical disc apparatus, which can record or reproduce information by irradiating a laser beam onto respective layers of the optical having plural numbers of recording/reproducing layers thereon. Also, in the Patent Document 1, there is the following description, for example, in the claim 1 thereof; "A tilt correction processing method for correcting a tilt amount or volume, being an inclination of a recording/reproducing surface of the optical disc with respect to an optical axis of the laser beam, comprising the following steps of: setting up the tilt volume in a step-like manner within a predetermined region, at a predetermined radial position on a recording/reproducing surface locating at the farthest distance from an irradiation side of said laser beam, within said plural numbers of layers; obtaining an optimal tilt correction volume upon basis of a calculation value of a predetermined signal, which can be obtained from said optical disc with respect to the tilt correction volume set up; and applying said optimal correction volume obtained also on a recording/reproducing layer other than said recording/reproducing layer locating at the farthest distance from the irradiation side of said laser beam".

Further, as a document relating to the tilt adjustment, there is also the following Patent Document 2. In this Patent Document 2, there is the following description, for example, in the claim 7 thereof; "The optical disc apparatus, wherein said serve parameter setup means adjusts a tilt mechanism for each of regions divided on one (1) recording surface, and memorized an adjustment value of brining amplitude of said data reproduction signal to be the maximum into a memorizing means, and an adjustment value for other recording surface is set to a value, which is obtained by adding a predetermined value or multiplying a predetermined value onto an adjustment value of the same region on the recording surface, which is already adjusted".
<Prior Art Documents>
<Patent Documents>
[Patent Document 1] Japanese Patent No. 4069087; and
[Patent Document 2] Japanese Patent Laying-Open No. 2008-090911 (2008).

BRIEF SUMMARY OF THE INVENTION

Before explaining about an object of the present invention, first of all, explanation will be given on the coma aberration, with referring to diagrams shown in FIGS. 2A and 2B. In case where there is no tilt on the disc as is shown in FIG. 2A, the laser beam condensed by an objective lens is condensed in the recording layer of the disc with generating almost no aberration. In case where there is tilt on the disc as is shown in FIG. 2B, the coma aberration generates at a focusing point on the recording layer. With this coma aberration, performances are deteriorated in recording of information or reproducing operation. For this reason, it is necessary to provide a tilt correction mechanism for compensating an influence of the coma aberration, and also a tilt adjusting process is necessary for detecting a tilt correction volume being appropriate for conditions of the disc and the apparatus.

Next, explanation will be made on an example of the steps of a process of the conventional tilt adjustment, by referring to FIG. 3. Steps of the adjustment will be shown in FIG. 3. In this FIG. 3, a tilt correction volume of an aberration correction mechanism 109 is set to an arbitrary value in a step S102, and in a step 103, measurement is executed on a physical quantity to be any index, such as, jitter, an error rate, an amplitude of reproduction signal, an amplitude of Wobble signal, an amplitude of tracking error signal, and so on (in FIG. 3, the jitter is shown as the example). In a step S104, it is determined if it is possible or not to calculate an optimal point thereof (e.g., it can be approximated in the form of an extreme value of a function of secondary degree in the case shown in FIG. 4), with the accuracy necessary thereto, in accordance with the method of least square, etc., for example, as is shown in FIG. 4. If it is impossible, the process comes back to the step S102, thereby to make the measurement of the index, repeatedly, while setting up a tilt correction volume different from. In case where determined it is possible to calculate in the step S104, the tilt correction volume at the optical point calculated is determined to be the optical tilt correction volume.

Next, before explaining about the problems to be dissolved according to the present invention, explanation will be given on the spherical aberration. On a BD (Blu-ray Disc), being one kind of the optical disc, for example, with applying an objective lens having high number of aperture (N/A), an influence of the spherical aberration increases upon an error of thickness of the disc substrate.

Explanation will be made on this spherical aberration, by referring to the diagrams shown in FIGS. 7A and 7B. In an optical system having the structure of suppressing generation of the spherical aberration so that the laser beam is condensed or focused at the focusing point on the recording layer having the thickness "t" of the substrate, as shown in FIG. 7A, the aberration generates on both the outside and the inside of the objective lens when the substrate thickness is changed by "Δt", as is shown in FIG. 7B. Due to variation in manufacturing of the optical discs may be generated an error of an order of several μm in thickness of the substrate of the recording layer, even for the same kind of the optical disc. For this reason, with having the structure for correcting the spherical aberration, it is necessary to reduce the influence of the spherical aberration by determining the correction volume, appropriately. Also, for reducing the influence of the spherical aberration generated for the error of thickness of the substrate, it is necessary to execute an adjustment of the spherical aberration, similar to the tilt adjustment mentioned above. And, as adjustment of the spherical aberration is already known a method of obtaining the optimal correction volume; i.e., the spherical aberration correction volume is determined in a step-like manner, by an arbitrary number of times, similar to the tilt adjustment mentioned above, to make measurement upon the physical quantity to be the index for each correction volume, and thereby calculating the extreme value through the method of least square, etc. Also, since the thickness of substrate differs from, on each recording layer, for the optical disc having the plural numbers of recording layers, different spherical aberrations are generated on those respective recording layers. For that reason, it is necessary to execute the adjustment mentioned above and correct the spherical aberration on each of the recording layers.

As was mentioned above, on the optical disc having the plural number of recording layers, for each of the layers has a parameter, the correction value/adjustment value of which should be obtained, preferably, by actually executing an adjustment process thereon. However, executing the adjustment process with using the least square, etc., for example, brings about an increase of processing time. In particular, a problem of increasing the processing time comes to be remarkable, for the optical disc having three (3) or more numbers of recording layers.

On the contrary to this, as is disclosed in the Patent Documents 1 and 2, there is already known a method of obtaining the adjustment value for other layer upon basis of the adjustment value of a certain layer. However, on the optical disc having three (3) or more numbers of recording layers, there can be considered an increase of interlayer distance between the recording layers and/or an increase of the number of error factors in the manufacturing processes due to the increase of the number of the recording layers; i.e., a factor of changing the aberration due to change of the thickness of substrate. For this reason, with the correction calculation upon basis of only the adjustment value for one (1) layer, sometimes it is impossible to obtain the correction value appropriate for the other layer.

As was mentioned above, from a viewpoint of preventing the processing time from being increased, it is preferable or desirable to obtain the adjustment value, after measuring the reproduction signal and/or the reflection light on the number of layers, as small as possible. On the other hand, from a viewpoint of maintaining the accuracy of the adjustment value, it is preferable or desirable to obtain the adjustment value, after measuring the reproduction signal and/or the reflection light on the number of layers, as large as possible.

Also, depending on the kind and/or the standard or regulation of the optical discs, the number of layers of the recording layers differs from, as well as, the interlayer distance between the recording layer and the recording layer. And, also the reflection factor and the transmission factor differ from, sometimes.

On the contrary to this, the inventors of the present invention obtains knowledge or a view that, on which recording layer the adjustment process upon basis of the reproduction signal and the reflection light should be executed, or on which recording layer the correction calculation for other layer should be executed, it differs from on each disc. There are many cases, for example, the nearer the distance between the layer, on which the adjustment process should be executed upon basis of the reproduction signal and the reflection light, and the layer, on which the correction calculation should be executed, the higher in the accuracy of the adjustment value obtained through the calculation, for example.

The present invention has an object of providing an optical disc apparatus for shortening the time necessary for the adjustment while maintaining the accuracy of a result of adjustment.

The object mentioned above is accomplished, for example, by the structures defined in the pending claims.

Also, the object mentioned above is also dissolved by the following means. Thus, according to the present invention, upon basis of the arrangement of the recording layers of an optical disc having "N" pieces of recording layers (N≧3, "N" is an integer), determination is made on "A" pieces of recording layers (A≧1, A<N, and "A" is an integer), to be executed with the adjusting process. With remaining "B" pieces of recording layers (B≧1, B<N, B=N−A and "B" is an integer), on which no adjustment is executed, calculation is made on the "B" pieces of correction values corresponding to the respective recording layers, upon basis of the correction values of adjusting results on other recording layers, upon which the adjustment is executed.

On each recording layer, it is determined on whether the correction value is obtained through the adjustment process, or is obtained through calculation, depending on the arrangement of the recording layers on the optical disc. The arrangement of the recording layers means thickness of substrate of the recording layer and/or a number of the recording layers, etc.

According to the present invention, it is possible to provide an optical disc apparatus of shortening the time necessary for adjusting while maintaining an accuracy of result of adjustment, with omitting the selection of the recording layer depending on the structure of an optical disc and an adjusting process.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 1 is a view for showing an example of structures of an optical disc apparatus, according to an embodiment of the present invention;

FIGS. 7A and 7B are views for diagrammatically showing a spherical aberration generating due to change of thickness of a disc substrate;

FIG. 10 is a view for showing an example of operations on the optical disc having four (4) recording layers;

FIG. 11 is a view for showing an example of operations on the optical disc having four (4) recording layers;

FIG. 12 is a view for showing an example of operations on the optical disc having three (3) recording layers;

FIG. 13 is a view for showing an example of operations on the optical disc having three (3) recording layers;

FIG. 16 is a view for showing an example of operations on the optical disc having four (4) recording layers;

DETAILED DESCRIPTION OF THE PREFERRED EMBODIMENTS

Figure 2A:
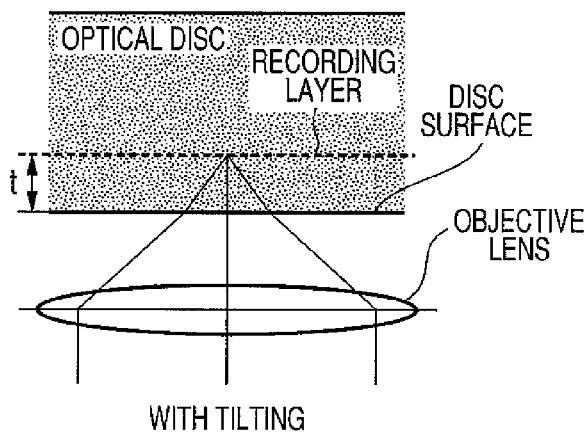
FIGS. 2A and 2B are views for diagrammatically showing the coma aberration, which is generated due to an inclination of a disc.

Hereinafter, embodiments according to the present invention will be fully explained by referring to the attached drawings. Also, the present invention should not be restricted to the present embodiments.

EXAMPLE 1

FIG. 1 shows an embodiment according to the present invention.

In FIG. 1, a reference numeral 101 depicts an optical disc having N pieces (N≧3, N is an integer) of recording layers, being accessible from a one side-surface thereof.

A reference numeral 102 depicts an objective lens for condensing a laser beam on the recording layer(s) of a disc.

A reference numeral 103 depicts a driver means for driving the objective lens 102.

A reference numeral 104 depicts an optical receiver for receiving the laser beam reflected on the optical disc.

A reference numeral 105 depicts an error signal producing means for producing a focus error signal indicative of shifting between a focus point on the disc and the recording layer, from the laser beam received by the optical receiver 104.

A reference numeral 106 depicts a drive signal producing means for producing a drive signal for driving the driving means 103.

A reference numeral 107 depicts a drive voltage supplying means for supplying drive voltage to the driving means 103 depending on the drive signal.

A reference numeral 108 depicts a laser.

A reference numeral 109 depicts an aberration correcting mechanism for correcting the aberration at the focus point on the disc.

A reference numeral 110 depicts an aberration correct controlling means for executing an aberration correction by driving the aberration correcting mechanism 109.

A reference numeral 111 depicts a controlling means. For example, the controlling means is implemented by a signal processing circuit, such as, a CPU, etc.

A reference numeral 112 depicts an adjusting means for adjusting the correction value for brining the aberration correcting mechanism 109 to be optimal while driving that aberration correcting mechanism 109, by means of the aberration correct controlling means 110.

A reference numeral 113 depicts a reproducing means for reproducing information recorded on the optical disc 101, from the reflection light that is received by the optical receiver 104 mentioned above.

A reference numeral 114 depicts a recording-layer number detecting means for detecting a number of the recording layers existing on the optical disc 101, from the error signal mentioned above or the information reproduced.

A reference numeral 115 depicts a distance information obtaining means for obtaining distance infuriation between the recording layers.

A reference numeral 116 depicts a memory means for memorizing the correction value of the aberration correction on each recording layer. The memory means 116 is implemented by a semiconductor memory, for example.

A reference numeral 117 depicts a calculating means for calculating the correction value for other recording layer from the correction value, which is memorized within the memory means 116.

A reference numeral 118 depicts a processing operation selecting means for selecting either one of the adjusting means 112 or the calculating means 117, on an arbitrary recording layer, depending on the distance information or the recording-layer number information, which are mentioned above.

A reference numeral 119 depicts a recording means for recording desired information on the disc 101 with modifying the laser 108.

In FIG. 1, the reference numerals from 102 to 104, 108 and 109 build up an optical head 120. The optical head 120 may further include 119 therein.

The apparatus shown in FIG. 1 produces a focus point through condensing the laser beam emitting from the laser 108 on the optical disc 101 by mean of the objective lens 102.

However, in the present optical disc apparatus, the error signal producing means 105, the drive signal producing means 106, the drive voltage supplying means 107, the aberration correct controlling means 110, the controlling means 111, the adjusting means 112, the reproducing means 113, the recording-layer number detecting means 114, the distance information obtaining means 115, the calculating means 117, the processing operation selecting means 118 and the recording means 119 are assumed to be implement by only one (1) LSI or MPU, for example. Or, any means maybe implemented by other LSI.

The aberration correcting mechanism 109, for correcting the influence of the coma aberration at the focus of the laser beam, which is generated on the optical disc 101 due to an inclination (i.e., tilt) of the optical disc 101, etc., is disposed within an optical path of the laser, being defined from the laser 108 and the objective lens 102. The structure of the aberration correcting mechanism 109 may be for inclining an angle of the objective lens 102, or for correcting an aberration distribution of the flux of laser beam, with using a liquid crystal, etc., for example. In the present embodiment, the explanation will be given in the following, assuming that the aberration correcting mechanism 109 inclines an angle of the objective lens 102, as an example thereof.

The adjusting means 112 is provided for obtaining the correction volume optimal on one (1) recording layer, through the operations described in the Patent Document mentioned above (hereinafter, being called "an adjusting process").

In the example of shown by the present embodiment, the adjusting means 112 executes setting up of the aberration correcting mechanism 109 by a plural number of times for one (1) recording layer, and also measurement of a signal to be an index, thereby enabling to derive the setup value of the aberration correcting mechanism 109 to be optimal.

Next, explanation will be made on a correction value obtaining process of the optical disc, according to the present embodiment, by referring to a flowchart shown in FIG. 5.

Firstly, the process is started by insertion of the optical disc 101 into the optical disc apparatus, and so on (step S201).

Next, in a step S202, obtaining is executed of the number of the recording layers by means of the recording-layer number detecting means 114. In a step S203, upon N pieces (N≧3, N is an integer) of recording layers obtained in the step S202 by means of the distance information obtaining means 115, distance information is obtained for the respective layers. The distance information of the recording layers may be a distance between the recording layers neighboring with, or may be a distance from a standard position, such as, a disc surface, etc., to each recording layer.

Figure 6A:
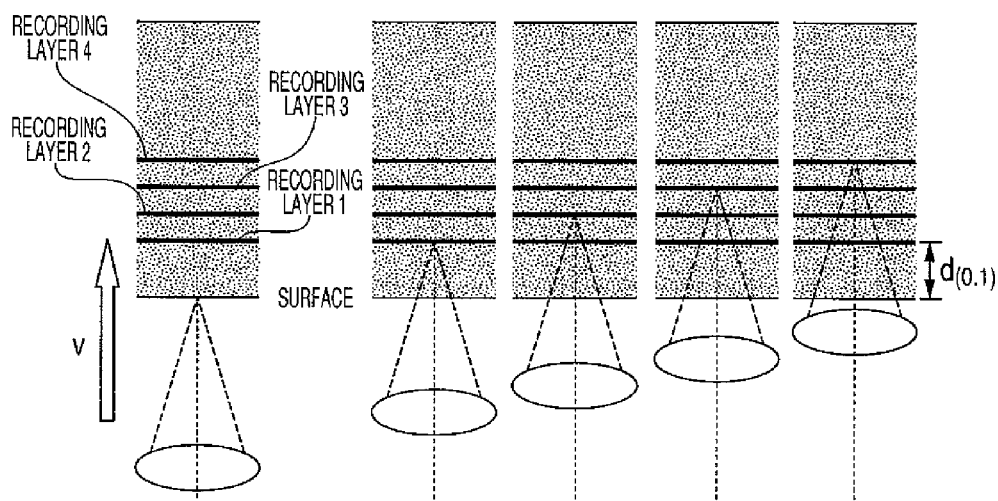
FIGS. 6A to 6C are views for showing the relationship between an optical disc having four (4) layers and a focus error signal.
Figure 6B:
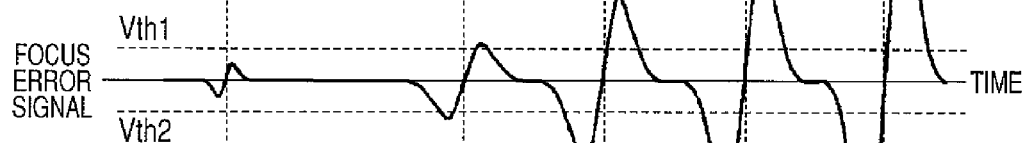

The recording-layer number detecting means 114 obtains the distance information of the recording layers, for example, with using the error signal obtained by the error signal producing means 105. As is shown in FIG. 6A, when driving the objective lens 102 at an almost constant velocity "v" so that the focus of the laser moves directing from the surface of the disc 101 having four (4) pieces of the recording layers into the depth thereof, a focus error signal and a signal of total light quantity (or, may be called "a pull-in error signal"), which are produced by the error signal producing means 105, are as shown in FIG. 6B. For example, if providing voltage threshold values "$V_{th1}$" and "$V_{th2}$" with respect to the focus error signal, for detecting the recording layer, and if assuming that one (1) piece of the recording layer exists when a signal level changes in the sequential order; e.g., "$V_{th2}$"→"0"→"$V_{th1}$", then it is possible to detect the number of all of the recording layers existing on the optical disc 101 by making the measurement thereof.

Figure 6C:
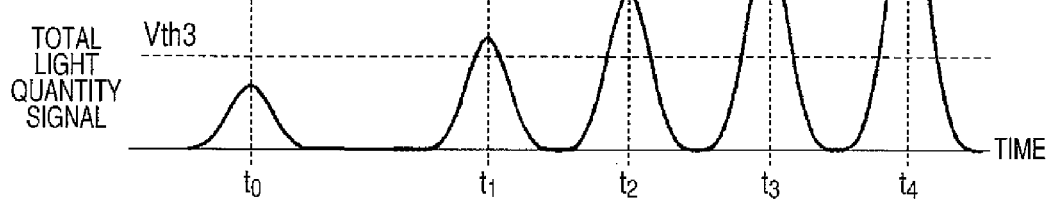

However, the operations of the recording-layer number detecting means 114 should not be limited to this mentioned above, but it may detect the number of the recording layers with using other signal, for example, the total light quantity signal, etc., as is shown in FIG. 6C, or it may be possible to detect the number of the recording layers existing in the disc by reproducing the management information, such as, a PIC and/or a DI, etc., which is/are recorded on the optical disc 101.

Also, the distance information obtaining means 115 can obtain the distance information of the recording layers, for example, in the similar manner to that of the recording-layer number detecting means 114. For example, with provision of voltage threshold value "$V_{th1}$" and "$V_{th2}$" for detecting the focus error signal shown in FIG. 6B, the recording layer can be detected in the middle of timing when detecting the signal by "$V_{th1}$" and timing when detecting the signal by "$V_{th2}$". Assuming that the time when detecting the $k^{-th}$ recording layer ("k" is an integer from 1 to N) is "$t_k$"), the distance between the $k^{-th}$ recording layer and a $h^{-th}$ recording layer (k≠h, "h" is an integer from 1 to N) can be expressed by $d(k,h)=(t_h-t_k)\times v$. In this manner, it is possible to know the distance information between the recording layers.

However, the distance from the surface to the $k^{-th}$ recording layer can be obtained, $d_k=(t_h-t_k)\times v$, while setting the voltage thresholds "$V_{th1}$" and "$V_{th2}$" to be equal or less than the signal level on the disc surface and determining the detection timing on the disc surface to "t0".

Also, the operations of the distance information obtaining means 115 should not be limited to this, and for example, the number of the recording layers may be detected from other signal, such as, the total light quantity signal, etc., or alternatively, information of the thickness of substrate of the recording layers maybe detected through reproduction of the management information, which is recorded on the optical disc 101. Also, explaining in other words, the distance information obtaining means 115 obtains the position information in the direction of thickness of each recording layer on the optical disc 101.

Or, in case where a relationship between the number of the recording layers and standard arrangement of the recording layers is regulated by a regulation, such as, the Blu-ray Disc, etc., for example, it is possible to determine a standard distance information between the respective recording layers, by obtaining the number "N" of the recording layers.

Also, the operations in the steps S202 and S203 may be executed, at the same time. In this instance, also the operations of the recording-layer number detecting means 114 and the distance information obtaining means 115 may be executed at the same time.

In a step S204, depending on the recording-layer number information and the distance information, which are mentioned above, the processing operation selecting means 118 classifies the "N" pieces of recording layers into: "A" pieces of recording layers (A≧1, A<N, and A is an integer), the correction values of which should be derived by the adjusting means 112 (hereinafter, "the recording layers of "a" group"), and "B" pieces of recording layers (B≧1, B<N, and B is an integer), the correction values of which should be derived by the adjusting means 117 (hereinafter, "the recording layers of "b" group").

Herein, explanation will be given on an example of the method, with which the processing operation selecting means 118 classifies the recording layers into the "a" group" and the "b" group", depending on the physical arrangement of the "N" pieces of recording layers on the optical disc 101. The classifying is executed on the recording layers depending on a predetermined threshold value "$D_{th}$" ($D_{th}$>0), with using the distance between the recording layers as the physical arrangement. For example, in case where the distance $d(i,j)$ between an $i^{-th}$ recording layer (i≦N, and "i" is an integer) and a $j^{-th}$ recording layer (j≦N, j≠I, and "j" is an integer) is equal or less than "$D_{th}$", it is assumed that the correction value of the $j^{-th}$ recording layer can be calculated from the correction value of the $i^{-th}$ recording layer, if derivation of the correction value is done by the adjusting means 112 on the $i^{-th}$ recording layer. In this instance, since there can be also considered a case contrary to the above, it is enough to execute the adjustment process on either one, the $i^{-th}$ recording layer or the $j^{-th}$ recording layer. The "N" pieces of recording layers are classified into the "a" group" and the "b" group", so that the correction value can be obtained by the adjusting means 112 or the calculating means 117, on all the recording layers from $1^{st}$ to $N^{th}$.

Further, the threshold value "$D_{th}$" is determined upon basis of the structures of the optical head 120, the number "N" of the recording layers included in the optical disc 101, designing of a servo-control of the optical disc apparatus, etc.

Also, other than the method of providing the threshold value with respect to the distance between the recording layers, it is possible to determine the recording layer as a target of learning in relation to an order of arrangement of the recording layers. For example, if it is possible to calculate the correction value with using the correction value of any one, within "m" pieces of recording layers neighboring with each other (m≦i−1, m≦N−I, and "m" is an integer), then it is possible to determine the correction value on the recording layers from $i-m^{th}$ to $i+m^{th}$, upon basis of the correction value on the $i^{-th}$ recording layer and the distance from the $i^{-th}$ recording layer, if executing the adjustment process on the $i^{-th}$ recording layer.

With such regulation as mentioned above, the processing operation selecting means 118 selects the recording layer (s), being less than "N" pieces in the number thereof, as the recording layers of the "a" group, upon which the adjustment process should be executed, upon basis of the structure of the optical disc, such as, the threshold value "$D_{th}$", etc. And also, depending on the structure of the optical disc, there is a case where the layer selected is a $C^{-th}$ recording layer (1<C≦N, and "C" is integer), which is not at the deepest side. For the present optical disc apparatus, with such the structures, it is possible to shorten the time for the adjustment, rather than deriving the correction value by the adjusting means 112 for all of the "N" pieces of recording layers. Also, with the present disc apparatus, it is possible to maintain the accuracy of the adjustment; for example, by deriving the correction value obtained from the adjusting means 112, even for the layer other than the deepest one.

And, if selecting the recording layers to be least in the number thereof, on which the adjustment should be executed (i.e., so that the number "A" of the recording layers of the "a" group comes to be the least), in accordance with such regulation as mentioned above, an efficiency is increased of shortening the adjusting time.

As an example, consideration will be paid upon case of a disc, as is shown in FIG. 10, having four (4) pieces of recoding layers in total; e.g., a first recording layer 801, a second recording layer 802, a third recording layer 803 and a fourth recording layers 804, each being disposed at distance of 10 μm from the neighboring recording layer. In this instance, if the distance of "$D_{th}$" is 15 μm between the recording layers, for which the correction values can be calculated, since the distance between the layers is 10 μm, it is possible to calculate the correction value with using the correction values of the recording layers neighboring with each other. In this instance, it is possible to obtain the correction values for all of the recording layers, if executing the adjustment process, necessarily, upon at least one (1) among the recording layers neighboring with the recoding layers of the "b" group, the correction values of which are derived by the calculating means 117 (i.e., the recording layers, on which the adjustment process should not be executed); in other words, if classifying them, so that at least one (1) of the recording layers neighboring to the recording layers of the "b" group is the recording layer of the "a" group, necessarily. In this manner, it is possible to maintain the accuracy to be high, of the correction value that is derived from the calculating means 117, with selecting the "b" group upon basis of the distance of "$D_{th}$" between the recording layers of the "a" group, for example.

If classifying them, fitting to the condition mentioned above, and also brining the number of times of the adjustment to be the least, then four (4) sets of patterns can be considered; i.e., a pattern 1 through a pattern 4, as is shown in FIG. 11. In accordance with any one of those, the correction value is derived, upon the recording layer of the "a" group by the adjusting means 112, upon the recording layer of the "b" group by the calculating means 117 with using the correction values of the recording layer(s) of the "a" group neighboring thereto, which is/are derived through the adjustment process, and thereby determining the correction values for all of the recording layers.

However, although there is shown the case having four (4) patterns, in the example mentioned above; but the present optical disc apparatus may be constructed to select a pattern including a layer, to which the focus-servo should be drawn or pulled in, at first, as the layer to be adjusted. With this process, it is possible to further shorten the adjusting time. Thus, in case if not including the layer to be drawn or pulled in at first within the layer(s), on which the derivation should be executed by the adjusting means 112, then it is necessary to move the focus (i.e., a focus jump) to the other recording layer, for the purpose of executing the adjustment, and this increases a total number of executing the focus jump, and thereby bringing about a possibility of increasing the adjustment time; on the other hand, if selecting the pattern including the layer, to which the focus-servo should be drawn or pulled in, at first, it is possible to suppress the increase of the adjusting time. As the layer, to which the focus-servo should be drawn or pulled in, at first, may correspond the first recording layer 801.

Also, it is possible to apply the structure of selecting a pattern including the layer, on which the management information is recorded, as the layer to be adjusted. With this process, it is possible to shorten the adjusting time, further. Thus, even in case where not including the layer, on which the management information is recorded, within the layer, on which the derivation should be executed, it is necessary to execute the focus jump to the layer, on which the management information is recorded, for the purpose of reproduction of the management information. For this reason, there is an anxiety or concern that the total number of the focus jumps increases; i.e., there is a possibility of increasing the adjusting time. If selecting the pattern including the layer, on which the management information is recorded, at first, it is possible to suppress the increase of the adjusting time. Herein, the management information may be, for example, an existing BCA and/or DI on the optical disc.

Also, the processing operation selecting means 118 may comprises a memory (not shown in the figure), as a managing means of information on the optical disc medium. And, the processing operation selecting means 118 may memorize a kind of the optical disc, which is loaded, and a layer number of the layer, on which the derivation of the correction value should be executed by the adjusting means 112, in advance, associating or referencing them with each other. Herein, the information on the optical disc may be a manufacturer of the optical disc, a type number of the optical disc, and/or a number indicative of a lot, etc.

Herein, turning back to FIG. 5. In a step S205, the processing operation selecting means 118 selects one (1) piece of the recording layer among the "N" pieces of recording layers. As an order of selection of the recording layer, there is a method of selecting it in the sequential order of the numbers, 1 to N, while distinguishing the "N" pieces of recording layers by attaching the numbers 1 to N, respectively, for example, and when the recording layers are aligned from the dept side, in a numerical order, judging from a side of the objective lens. Or, among the recording layers, 1 through N, at first, only the recording layers of the "a" group may be selected, with priority, which are classified by the processing operation selecting means 118.

In a step S206, the processing operation selecting means 118 divides the process depending on the recording layer that is selected, i.e., on whether it is the recording layer of the "a" group or the recording layer of the "b" group.

In the step S206, if it is the recording layer of the "a" group, then the process shifts into a step S207, and the driving means 103 move the focus position onto the recording layer of a target. In a step S208, the aberration correction setup value is adjusted to be optimal on the recording layer by the adjusting means 112. Herein, when moving the focus position to the recording layer of the target, it is possible to set the correction value, which is obtained from calculation by the calculating means 117, as a temporary or provisional correction value, or to apply an initial value, which is determined in advance.

On the other hand, if it is the recording layer of the "b" group, the process advances to a step S209, wherein the calculating means 117 derives the optimal aberration correction value for the recording layer selected, via calculation thereof.

Next, explanation will be med on an example of a method for calculating the correction value in the calculating means 117. For example, when calculating an adjustment result "$\theta_j$" on a $j^{th}$ recording layer ($i \leq N$, $|i-j|=1$, and "j" is an integer), from the correction value "$\theta_i$", which is already adjusted on the $i^{th}$ recording layer ($i \leq N$, and "i" is an integer), a conversion is made by multiplying a coefficient k(i,j), which should be determined in accordance with a magnifying power of the optic system and/or the distance d(i,j) between the recording layers (i.e., $\theta_j = k(i,j) \times \theta_i$). However, calculation of the correction value obtained by the calculating means 117 is lower in the accuracy than obtaining the correction value by the adjusting means 112, since it receives influences of two (2) accuracy, e.g., an adjustment accuracy of the adjusting means 112 for obtaining an original adjustment value (for example, $\theta_t$) and an obtaining accuracy of the distance information obtaining means 115 for obtaining the distance information (for example, d(i,j)).

In the calculating means 117 is needed an aberration correction adjustment value on other recording layer, other than the recording layer selected. However, it is not necessary to execute the calculation in case where the adjustment is not yet executed on the other recording layer, which is needed in the stage of processing in the step S209. Also, at the stage of determining the recording layer of a target in the step S205, in particular, regarding the recording layer, the correction value of which cannot be calculated, it may be processed so that it should not be selected.

Next, in a step S210, the memory means 116 memorizes the correction value on the recording layer of the target, which is obtained in the step S208 or the step S209, therein. In this instance, memorization is so made that the correspondence between the correction value and the recording layer can be obtained. For example, recording layer numbers 1 to N may be related with the correction values, or alternatively, an address or the like of the memory region may be defined in advance, into which the correction values on the recording layers 1 to N should be recorded. Or, into the memory means 116 may be memorized the information, on whether the derivation of the correction value is executed within the adjusting means 112 or within the calculating means 117, by making correspondence to the correction value.

Next, in a step S211, the optical disc apparatus obtains information indicative of whether the correction values can be obtained or not, for all of the "N" pieces of recording layers on the optical disc 101, through control of the controlling means 110, for example. In a step S211, in case where the correction value is already derived, the process advances into a step S212, and thereby completing the process. On the other hand, if there is still a recording layer, the correction value of which is not yet derived, the process turns back to the step S205, wherein the process is repeated thereon by selecting one of the recording layers, the correction values of which are derived from.

However, in the present embodiment is shown the example that the processing operation selecting means 118 selects the operation upon both the number "N" of the recording layers and the information of the physical arrangement of the "N" pieces of the recording layers; however it should not be restricted to this. For example, the processing operation selecting means 118 may select the operation by obtaining the number "N" of the recording layers when a standard arrangement of the recording layers is defined or regulated depending on the number of the recoding layers, by the regulation, such as, the Blu-ray Disc or the like, for example, or may select the operation only depending on the order of the arrangement of the recording layers by detecting only the number "N" of the recording layers, but not depending on the thickness of the substrate.

Figure 2B:
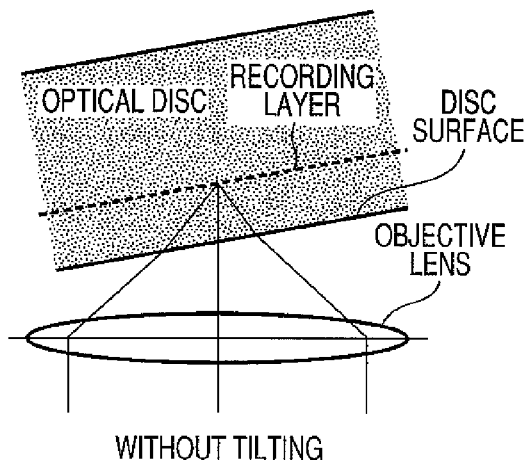
Figure 3:
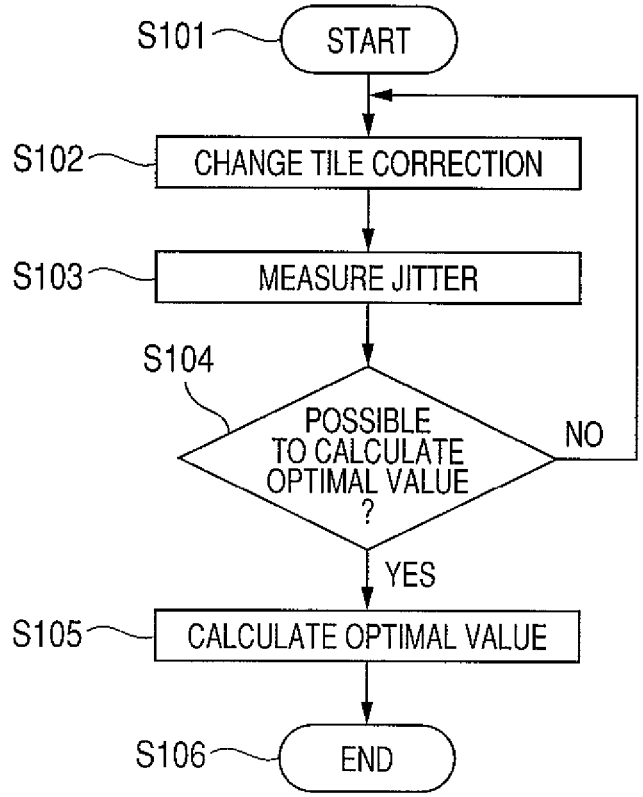
FIG. 3 is a view for showing an adjustment process for correcting the coma aberration.
Figure 4:
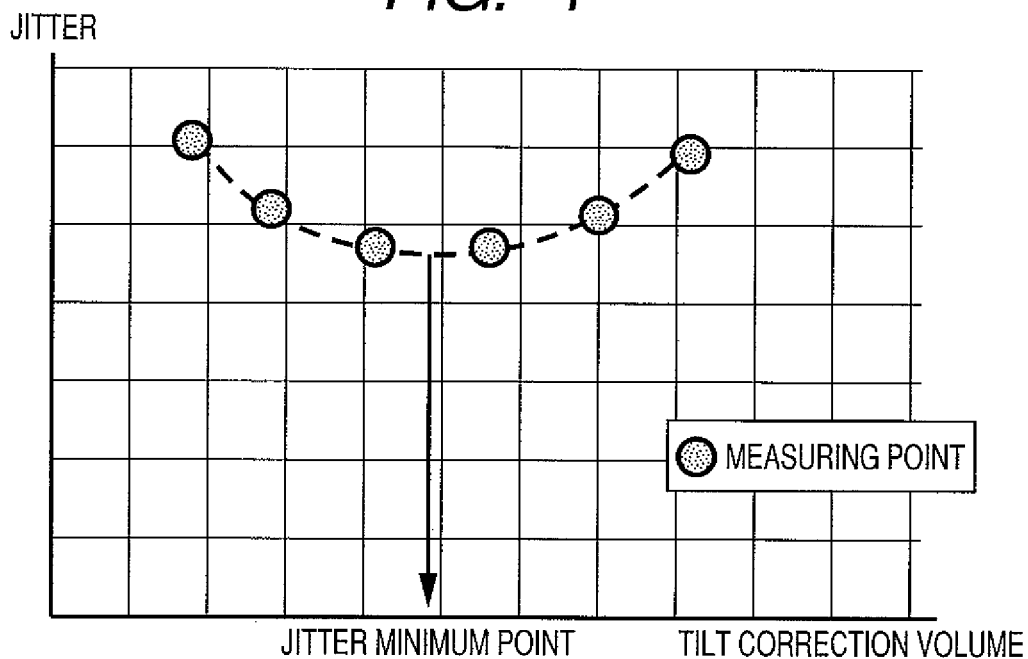
FIG. 4 is a view of plotting the relationship between a tilt correction volume and jitter.

Also, as is shown in FIGS. 2A and 2B, the coma aberration becomes large in proportion to the thickness of substrate of the disc. For this reason, the influence of the spherical coma aberration to the disc inclination is large, on the recording layer existing in the depth when seeing it from the laser irradiation surface of the disc. Accordingly, when executing the adjustment process, an amount or volume of fluctuation of the index value with respect to the correction value of the aberration correcting mechanism 109 becomes larger on the recording layer existing, as it goes into the depth. By taking this into the consideration thereof, the processing operation selecting means 118 may make selection of the recording layer in such that the adjustment process is executed with priority, upon the recording layer existing in the depth much more.

Also, though there is picked up the optical disc having four (4) pieces of the recording layers, as the example thereof, in the present embodiment; however, the number of the recording layers should not be limited to this. If picking up an example of a case where determining $D_{th}$=15 and the each distance between the recording layers at 10 μm, similar to that shown in FIGS. 10 and 11, patters of the classification of the recording layers, which are executed by the selecting means 118, as shown in FIGS. 12 and 13. If determining the number of times of executing the adjustment process with priority, then a pattern 2 is selected. In case where the adjustment process is executed on the recording layer existing at the endmost, then selection may be made on a pattern 1. Selection of those patterns 1 and 2 may be executed by the processing operation selecting means 118 upon the operation made by the user. Or, for example, the selection may be made by a signal upon basis of the operation by the user, which is inputted from a host apparatus (not shown in the figure).

Also, though in the present embodiment is shown the example of executing the derivations of the correction values for all of the recording layers, at one time; but the timing of executing the adjustment or the calculation should not be restricted to this. For example, there can be considered a method, while obtaining the correction values, in advance, for the recording layers of the "a" group, upon which the adjustment process should be executed, but for the recording layers of the "b" group, the calculation process is executed one by one, successively, when it is necessary to move the focus point to that recording layer.

Also, a part of all of the correction values derived from may be recorded on the optical disc 101.

In the explanation given in the above, although the explanation was made on the process for obtaining the correction value of the coma aberration by the optical disc apparatus; however, it can be applied in a process for obtaining the correction value of, not the coma aberration, but the spherical aberration. Hereinafter, explanation will be given on the method for obtaining the correction value of the spherical aberration.

However, in the method for obtaining the correction value of the spherical aberration, in FIG. 1, it is assumed that the aberration correcting mechanism 109 corrects the spherical aberration at the focus point, which is generated on the optical disc 101. Also, the aberration correcting mechanism 109 is disposed within the laser optical path between the laser 108 and the objective lens 102. The structure of the aberration correcting mechanism 109 may be for correcting the aberration by driving the lens position disposed within the laser optical path, or may be for correcting the aberration by changing a phase distribution in a laser beam flux through a liquid crystal, etc. In the present embodiment, explanation will be given hereinafter, assuming that the structure is for correcting the aberration by driving the lens position.

Figure 5:
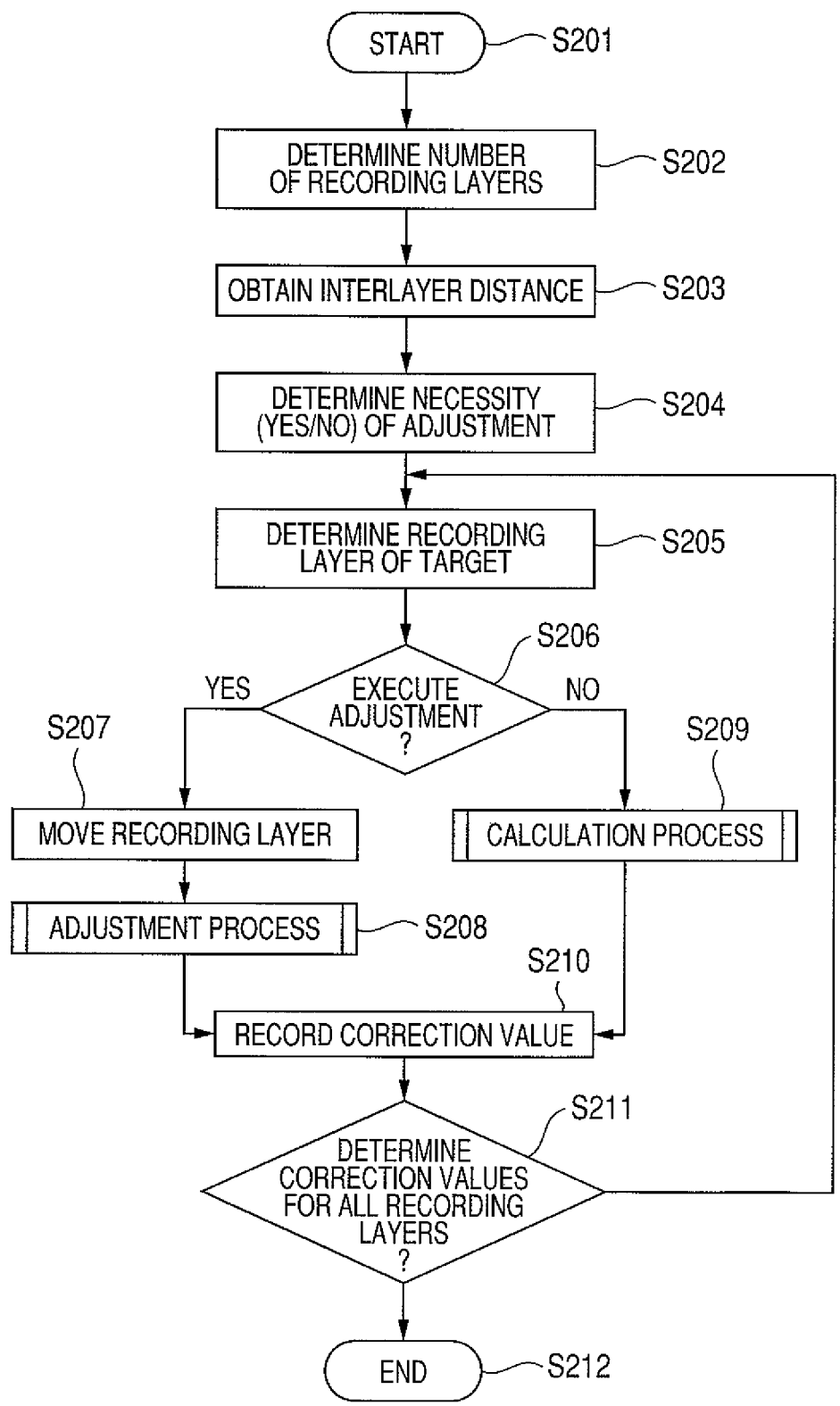
FIG. 5 is a flowchart for showing a process for obtaining correction value within the optical disc apparatus.

Also, regarding the process for obtaining the correction value of the spherical aberration, a rough flow of that process is shown by the flowchart shown in FIG. 5, similar to the process for obtaining the correction value of the coma aberration. However, it differs from, in particular, in the details of the adjustment process within the step S208 and in the calculating process within the step S209.

In the step S208, the adjusting means 112 derives the setup of the aberration correcting mechanism 109, so that the influence of the spherical aberration comes to the smallest, by repeating the measurement of the signal to be the index, while changing the setup of the aberration correcting mechanism 109 on each of the recording layers.

Herein, explanation will be given on the adjustment process of the spherical aberration, with using a flowchart and a plotting view shown in FIGS. 9 and 10.

Figure 8:
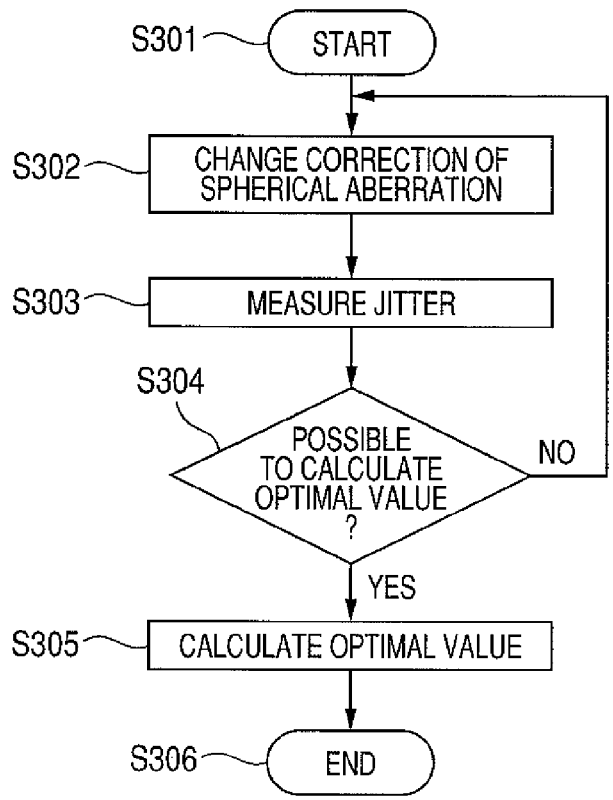
FIG. 8 is a flowchart for showing an adjustment process for correcting the spherical aberration.
Figure 9:
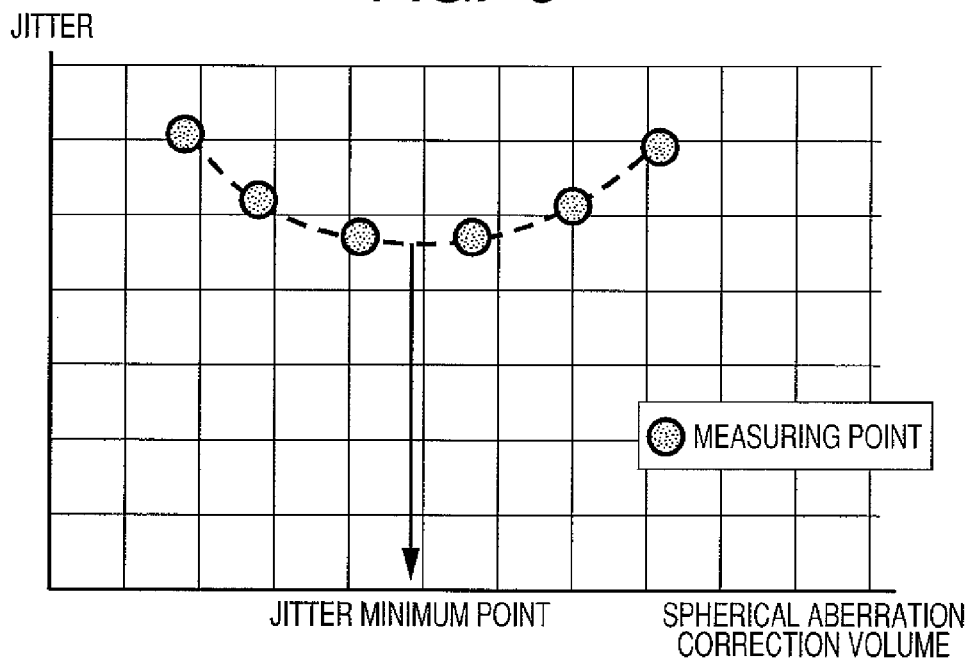
FIG. 9 is a view of plotting the relationship between a correction volume of the spherical aberration and jitter.

In FIG. 9, firstly, the adjustment process is started in a step S301. Next, in a step S302, the aberration correct controlling means 110 sets up a spherical correction volume of the aberration correcting mechanism 109 at an arbitrary value. Next, in a step S303, the adjusting means 112 and the reproducing means 113 make measurement on any physical quantity to be the index, such as, the jitter, the error rate, the amplitude of the reproduction signal, the amplitude of the Wobble signal, or the amplitude of the tracking error signal, etc. (in FIGS. 8 and 9, the jitter is shown as the example). In a step S304, the adjusting means 112 determines on whether the optimal point (the extreme value of the function of secondary degree in the example shown in FIGS. 8 and 9) can be calculated or not, with accuracy necessary for, through the method of least square, etc., as is shown in FIG. 9, when approximating the physical quantity to be the index mentioned above in the form of the function of the correction value of the spherical aberration (it can be approximated in the form of the function of secondary degree, in the example shown in FIGS. 8 and 9). In case where it is impossible to calculate in the step S304, the process turns back to the step S302, wherein the measurement is executed on the index value, repeatedly, with setting up a different correction volume of the spherical aberration. In the other hand, when determined it is possible to calculate, the extreme value calculated is used as an optimal correction volume of the aberration.

However, when moving the focus point onto the recording layer of the target for executing the adjustment process thereon, the optical disc apparatus may set up the correction value, which can be obtained through the calculation made by the calculating means 117, as a temporary or provisional correction value, or may apply an initial value, which is determined in advance.

Also, in the step 209, by means of the calculating means 117, the optimal correction value of the aberration on the recording layer selected is derived from, through the calculation thereof.

Herein, explanation will be given on an example of the method for calculating the correction value in the calculating means 117, in the present embodiment, by referring to FIGS. 7A and 7B. As is shown "Ws∝Δt" in the FIGS. 7A and 7B, the volume of the spherical aberration generating on each recording layer is in proportion to an amount of change of the thickness of substrate of the disc. Accordingly, also in the present embodiment, the calculating means 117 can calculate the correction volume of the spherical aberration on the other recording layer, in relation to the thickness of the substrate, from the correction volume of one recoding layer, if the thickness of substrate is apparent. For example, the adjustment process is executed on the $i^{th}$ recording layer, and as a result of the adjustment, when the correction volume of the aberration correcting mechanism 109 (i.e., the position of a lens for use of correcting the aberration) is obtained as "$X_i$", then the optimal correction volume "$X_j$" of the spherical aberration on the $j^{th}$ recording layer, which is located at the position at the distance d(i,j) from the $i^{th}$ recording layer, can be calculated as $X_j=X_i+h_{as}×d(i,j)$. However, herein, the coefficient "$h_{as}$" is one, which can be determined upon the optic system of the optical disc apparatus and/or a material of the optical disc, etc. Calculation of the correction value by the calculating means 117 is lower in the accuracy than calculating the correction value by the adjusting means 112, since it receives the influences of two (2) accuracies; e.g., an adjustment accuracy of the adjusting means 112 for obtaining an original adjustment value (for example, $X_i$) and an obtaining accuracy of the distance information obtaining means 115 for obtaining the distance information (for example, d(i,j)).

<Embodiment 2>

In the explanation given in the above, the explanation was given on the process for obtaining the correction value of the coma aberration or the spherical aberration of the present optical disc apparatus.

Next, explanation will be given on an example of other operations of the present optical disc apparatus. In more details, explanation will be given on an example of operation for setting up or determining the correction value to be executed before execution of recording or reproduction of information onto/from the corresponding recording layer, when a focus control is necessary for moving to different recording layer upon a request of recording or reproducing, etc., for the optical disc 101 having the "N" pieces of recording layers.

However, in the explanation of the example of this operation for determining, in FIG. 1, it is assumed that the aberration correcting mechanism 109 may be a correcting mechanism for correcting the coma aberration or maybe correcting mechanism for correcting the spherical aberration.

Figure 14:
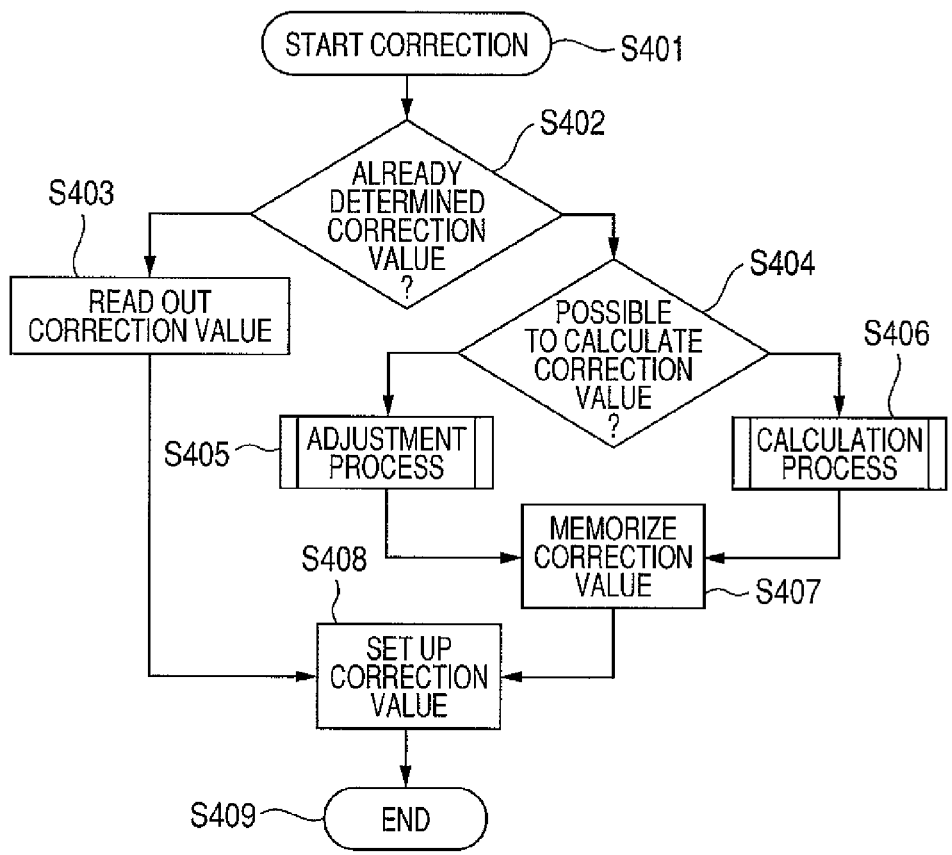
FIG. 14 is a flowchart for showing a setup process of the correction value when recording/reproducing.

Hereinafter, explanation will be given on the process for determining the correction value when recording/reproducing, by referring to the flowchart shown in FIG. 14.

When the focus control is necessary for moving to the different recording layer, upon recording or reproducing, the process is started by a step S401.

In a step S402, for example, the controlling means 111 confirms if the correction value is determined or not, on the recording layer to be the target of the focus control.

In case where the correction value is already determined in the step S402, the controlling means 111 transits into a step S403, thereby reading out information of the setup value from the memory means 116. Thereafter, in a step S408, the controlling means 111 sets the correction value into the aberration correcting mechanism 109, through the aberration correct controlling means 110, and thereby completing the process.

On the other hand, if the correction value is not yet determined in the step S402, the process advances into a step S404, wherein determination is made on the correction value can be calculated or not on the recording layer of the target by the processing operation selecting means 118.

In the present embodiment, the processing operation selecting means 118 selects the process for deriving the correction value on the recording layer of the target, from the physical arrangement of the "N" pieces of recoding layers on the optical disc 101 and the correction value of other recoding layer, which is reserved in the memory means 116.

Explanation will be made on an example of operation of the processing operation selecting means 118, below. For example, it is assumed that the numbers 1 through N are attached onto the "N" pieces of the recording layers on the optical disc 101. In this instance, it is also assumed that the respective recording layers are arranged from the depth side of the optical disc 101 when seeing it from the objective lens 102, in the sequential order from $1^{st}$. In this instance, the distance between the recording layers is used as the physical arrangement, and a predetermined threshold value "$D_{th}$"

($D_{th}>0$) is provided. When the recording layer to be the target is the $i^{th}$ recording layer ($i>0$, $i\leq N$, and "i" is an integer), on any one of other recording layers existing at the distance of "$D_{th}$" from the $i^{th}$ recording layer, it is possible to derive the correction value by the calculating means 117 on the $i^{th}$ recording layer when the correction value is derived by the adjusting means 112. On the other hands, when the correction value is not yet determined or derived by the calculating means 117, on all other recording layers existing at the distance of "$D_{th}$" from the $i^{th}$ recording layer, it is determined that the correction value cannot be calculated on the $i^{th}$ recording layer, and thereby deriving the correction value by the adjusting means 112.

Figure 15:
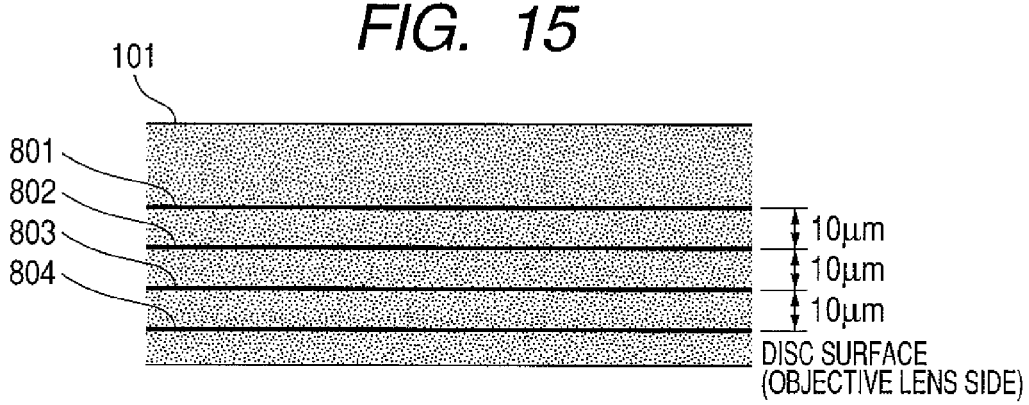
FIG. 15 is a view for showing an example of operations on the optical disc having four (4) recording layers.

As an example of this process, explanation will be given on the process, in case where the optical disc 101 is the disc shown in FIG. 15. The optical disc 101 shown in FIGS. 15 and 16 has the structure of disposing four (4) pieces of the recording layers at distance 10 μm between the recording layers. Also, in the process of the present embodiment, it is assumed that "$D_{th}$" is 15 μm. On such disc, an example when moving the focus control onto a third recording layer is shown on a table shown in FIG. 16. On the table shown in FIG. 16, "not executed" indicates that the correction value of the aberration is not yet derived on that recording layer, "already adjusted" indicates that the correction value is already derived by the adjusting means 112, and "already calculated" indicates that the correction value is already derived by the calculating means, respectively.

As is shown by patterns A and B in FIG. 16, a second recording layer and a fourth recording layer, separating from a third recording layer at 10 μm within 15 μm, are in the condition of "already calculated" or "not executed", and further in case when the third recording layer is in the condition of "not executed", the optical disc apparatus determines the correction value by the adjusting means 112 when it moves the focus onto the third recording layer (indicated by "adjusting", in a column of "operation when moving to third recording layer" on the table).

On the other hand, as is shown by patterns C and D on the table, in case when there exists even one recording layer of condition "already adjusted", on the second recording layer or the fourth recording layer separating from the third recording layer at 10 μm within 15 μm, and "not executed" on the third recording layer, the optical disc apparatus determines that it is possible to calculate the correction value on the third recording layer by the calculating means 117 (indicated by "calculating" in a column of "operation when moving to third recording layer" on the table).

However, the distance between the recording layers can be obtained by the distance information obtaining means 115. The operations of the distance information obtaining means 115 are same to that in the embodiment 1, and therefore the explanation thereof will be omitted herein. Also, that distance information may be reserved in a buffer for exclusive use, which is provided within the memory means 116 or the distance information obtaining means 115, thereby to read out that every time when it is necessary to move the recording layer. However, the threshold value "$D_{th}$" is determined depending on the structure of the optical head 120, the number "N" of the recoding layers owned by the optical disc 101, design of the servo control of the optical disc apparatus, etc., and should not limited to the numerical value shown as the example.

Also, in the step S404, if it is not possible to calculate the correction value through calculation within the calculating means 117, then the process advances into a step S405. In the step S405, adjustment is executed on the correction value of the aberration by the adjusting means 112, and thereby deriving the correction value therefrom. The operation of the adjusting means 112 is same to that in the embodiment 1.

On the other hand, when it is possible to calculate, the process advances into a step S406, and thereby executing the calculation of the correction value of the aberration by the calculating means 117. The operation of the calculating means 117 is same to that shown in the embodiment 1.

In a step S407, the correction value, which is derived from in the step S405 or the step S407, is memorized in the memory means 116.

In a step S408 is set up the correction value in the aberration correcting mechanism 109, and the process is completed (in a step S409).

In the present embodiment, although there is shown the example that the processing operation selecting means 118 selects the operation upon the information of the physical arrangement of the "N" pieces of the recording layers; however, the operation may be selected by obtaining the number "N" of the recording layers, when a normal arrangement of the recording layers is defined depending on the number of the recording layers, by the regulation, such as, the Blu-ray Disc, etc., for example, or may select the operation selection depending on the sequential order of arrangement of the recording layer, by only obtaining the number "N" of the recording layers, but not depending on the thickness of substrate.

Also, in the present embodiment, although there is picked up the example of the optical disc having four (4) recording layers; however, the number of the recording layers should not be limited to this. For example, it may be an optical disc having three (3) layers or may be an optical disc having five (5) or more of layers.

Also, a part or all of the correction volumes derived from may be recorded on the optical disc 101.

However, the present invention should not be restricted to the embodiments mentioned above, but it may include various modifications thereof. For example, the embodiments mentioned above are explained in details thereof, for clear or easy understanding of the present invention, but the present invention should not be limited to that having all of the constituent elements mentioned above. Also, it is possible to substitute a constituent element of other embodiment for a part of the constituent element of a certain embodiment, or to add the constituent element of other embodiment to the constituent element of a certain embodiment. And also, with a part of the constituent element of each embodiment, it is possible to be added, deleted or substituted by the constituent element of other embodiment.

Also, with each of the constituent elements mentioned above, a part or all thereof may be constructed with hardware, or may be so constructed that it is achieved with execution of a program by the processor. Also, with the control lines and/or the information lines, there are shown only ones necessary for the explanation, but there are not shown all of the control lines and/or the information lines necessary for the actual product. In actual, it can be considered, almost of all the constituent elements are connected with, mutually.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disc apparatus, for executing recording or reproducing onto/from an optical disc having "N" pieces of recording layers (N≧3, "N" is an integer), from a first layer to a $N^{th}$ layer, comprising:
  a light emitting portion, which is configured to emit a laser beam;
  a light receiving portion, which is configured to receive a laser beam reflected upon, from said optical disc;
  a correcting portion, which is configured to correct a tilt of said optical disc or an aberration of said laser beam;
  an adjusting portion, which is configured to obtaining a correction volume of said correcting portion on the corresponding recording layer, upon basis of a reflection light obtained from the recording layer to be a target;
  a detecting portion, which is configured to detect a layer structure of said optical disc; and
  a selecting portion, which is configured to select "A" pieces of recording layers (A <N, and "A" is an integer) depending on the layer structure of said optical disc, wherein
  said adjusting portion obtains said correction volumes on the "A" pieces of recording layers, which are selected by said selecting portion.

2. The optical disc apparatus, described in the claim 1, wherein
  said selecting portion selects the "A" pieces of recording layers (A<N, and "A" is an integer) including a $C^{th}$ layer (1<C<N, and "C" is an integer).

3. The optical disc apparatus, described in the claim 1, further comprising:
  a calculating portion, which is configured to obtain said correction volume on the recording layer to be the target from the correction volume of other recording layer, wherein
  said calculating portion calculates "B" pieces of correction volumes corresponding to the "B" pieces of recording layers (B=N−A), the correction volumes of which are not obtained by said adjusting portion, upon basis of at least one or more correction volume(s) of said "A" pieces of correction volumes and recording-layer position information.

4. The optical disc apparatus, described in the claim 1, wherein
  said selecting portion executes the selection of the recording layers so that at least one or more of the "A" pieces of recording layers to be executed with adjustment thereon, within a range of distance "D" (D>0) from "B" pieces (B=N−A) of the recoding layers, the correction volumes of which are not obtained by said adjusting portion.

5. The optical disc apparatus, described in the claim 1, wherein
  selection is made so that at least one of the recoding layers existing in neighbor with "B" pieces (B=N−A) of the recoding layers, the correction volumes of which are not obtained by said adjusting portion is either one of the "A" pieces of recording layers to be executed with the adjustment thereon.

6. The optical disc apparatus, described in the claim 1, wherein
  said selecting portion executes a selection so that two (2) pieces of recording layers existing on a side nearest to an objective lens and on a side farthest from the objective lens are included in the "A" pieces of recording layers to be executed with the adjustment thereon.

7. The optical disc apparatus, described in the claim 2, wherein
  said selecting portion selects the recording layers so that the number "A" comes to minimum.

8. The optical disc apparatus, described in the claim 1, wherein
  the layer structure of said optical disc is a number of the recording layers owned by said optical disc.

9. The optical disc apparatus, described in the claim 1, wherein
  the layer structure of said optical disc is positions of the recording layers owned by said optical disc in a direction of thickness in said optical disc.

10. The optical disc apparatus, described in the claim 1, further comprising:
  an objective lens, which is disposed to face to a lens;
  a driving portion, which is configured to drive said objective lens in a focusing direction; and
  a focus error signal producing portion, which is configured to produce a focus error signal indicating a position relationship between said focus position and the recording layer in the focusing direction, from the laser beam received by said light receiving portion, wherein
  said detecting portion detects the layer structure of said optical disc, by said focus error signal when driving the objective lens by said driving portion.

11. The optical disc apparatus, described in the claim 1, wherein
  said detecting portion detects the number of the recording layers upon basis of management information, which is reproduced from the optical disc.

* * * * *